July 23, 1929.　　　W. J. HAWKINS　　　1,721,557

INTERCHANGEABLE FILLER FEED FOR CIGAR MACHINES

Filed April 14, 1928　　2 Sheets-Sheet 1

INVENTOR
Wilford J. Hawkins
BY
Sydney P. Prescott
ATTORNEY

July 23, 1929.   W. J. HAWKINS   1,721,557
INTERCHANGEABLE FILLER FEED FOR CIGAR MACHINES.
Filed April 14, 1928    2 Sheets-Sheet 2

INVENTOR
Wilford J. Hawkins
BY
Sydney J. Prescott
ATTORNEY

Patented July 23, 1929.

1,721,557

UNITED STATES PATENT OFFICE.

WILFORD J. HAWKINS, OF CLAIBORNE, MARYLAND, ASSIGNOR TO INTERNATIONAL CIGAR MACHINERY COMPANY, A CORPORATION OF NEW JERSEY.

INTERCHANGEABLE FILLER FEED FOR CIGAR MACHINES.

Application filed April 14, 1928. Serial No. 270,073.

This invention relates to tobacco feeds for cigar machines, its object being to equip a long filler cigar machine with a demountable long filler feed and in addition provide it with a short filler or scrap feed attachment which can be readily mounted on the machine in place of the long filler feed, so that a machine so equipped may be used to make either long or short filler cigars, thus avoiding the necessity which heretofore existed for two complete machines which were 5/6 alike.

In the long filler cigar machines, the filler tobacco is fed by hand into the charge-forming mechanism which delivers a level tobacco layer of uniform density upon the main feed belt, which carries it to the charge-cutter by which it is cut up into individual bunch charges to be subsequently rolled into cigar bunches which are then pressed into the desired shape and finally wrapped to form the finished cigars.

In modern scrap bunch machines, the filler scrap is fed automatically from a hopper onto a conveyer on which it is formed by suitable mechanism into a level layer from which the individual bunch charges are then cut.

In order to achieve the object of this invention, therefore, the machine frame, drives, and filler feeds are so arranged that the feed belt of the cigar making machine can be supplied either by a long filler feeding mechanism or by a short filler feeding mechanism, so designed that each can be readily dismounted and the other installed in its place.

With these and other objects not specifically mentioned in view, the invention consists of certain constructions and combinations which will be hereinafter fully described and then specifically set forth in the claims hereunto appended.

For the purpose of illustrating a practical machine carrying out this invention, a cigar machine is shown in the accompanying drawings which is demountably fitted with a long filler cross feed similar to that described in application #185,177 (Bronander cigar-filler feed, Apr. 20, 1927), which machine is provided with suitable brackets and drives so that, upon demounting the long filler feed and installing a scrap feed similar to that described in U. S. Patent #1,637,800, a scrap layer may be delivered upon the main feed belt of the machine in place of the former long filler charge layer. Obviously other long filler and short filler feeding mechanism can be used in carrying out the invention, the invention not being confined to any particular type of long filler and short filler feeding mechanism. In order to make the two tobacco feeds interchangeable, certain modifications are made in both of them, as is shown in the accompanying drawings, in which—

In carrying the invention into effect, there is provided in a cigar machine having a feed belt and associated operating mechanism, a frame supporting said belt and mechanism, and means are provided for selectively supporting and driving the long filler feeding mechanism and the short filler feeding mechanism delivering filler to said belt, in order that the major portion of the cigar machine may selectively operate on either long filler or short filler. In the best constructions also, the long filler feeding mechanism is transversely arranged with respect to said belt and the short filler mechanism is longitudinally arranged with respect to said belt. The means above referred to may be widely varied within the scope of the claims, for the particular machine selected to illustrate the invention is but one of many possible embodiments of the same. The invention, therefore, should not be restricted to the precise details of the structure shown and described.

Figure 1:
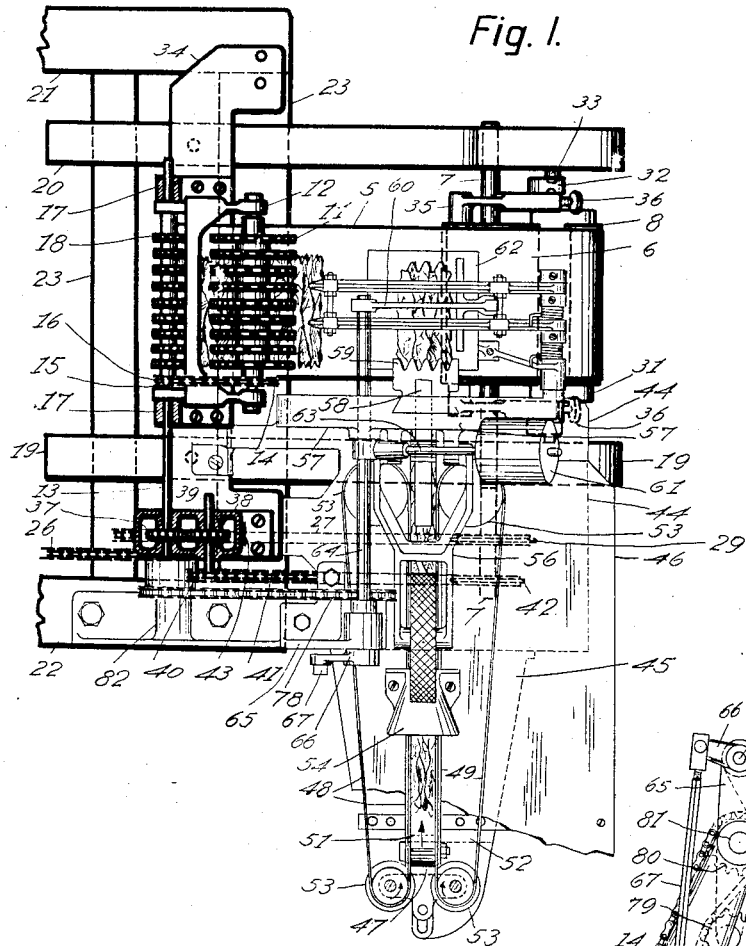
Fig. 1 is a top view, partly in section, of the feed end of a cigar machine equipped with a long filler feed.
Figure 2:
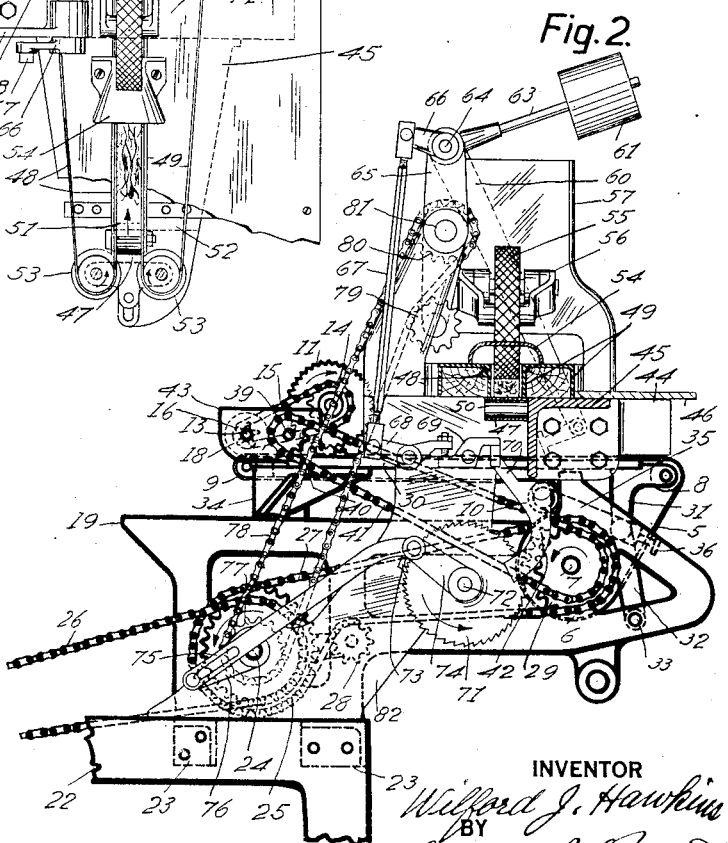
Fig. 2 is a side elevation, partly in section, of the assembly shown in Fig. 1.
Figure 3:
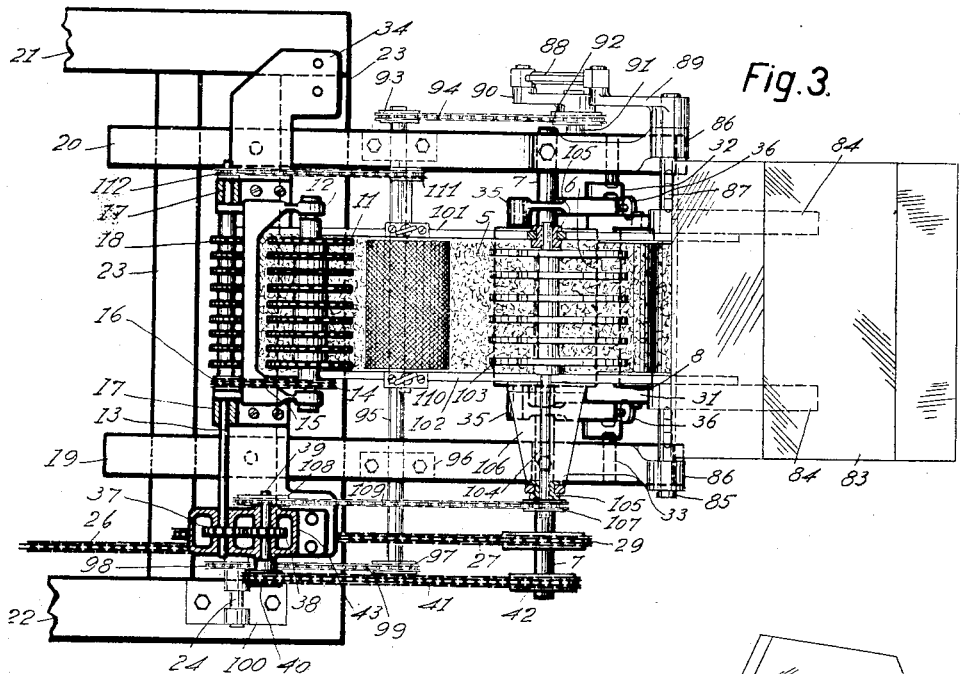
Fig. 3 is a top view, partly in section, of the feed end of the same cigar machine equipped with a scrap filler feed.
Figure 4:
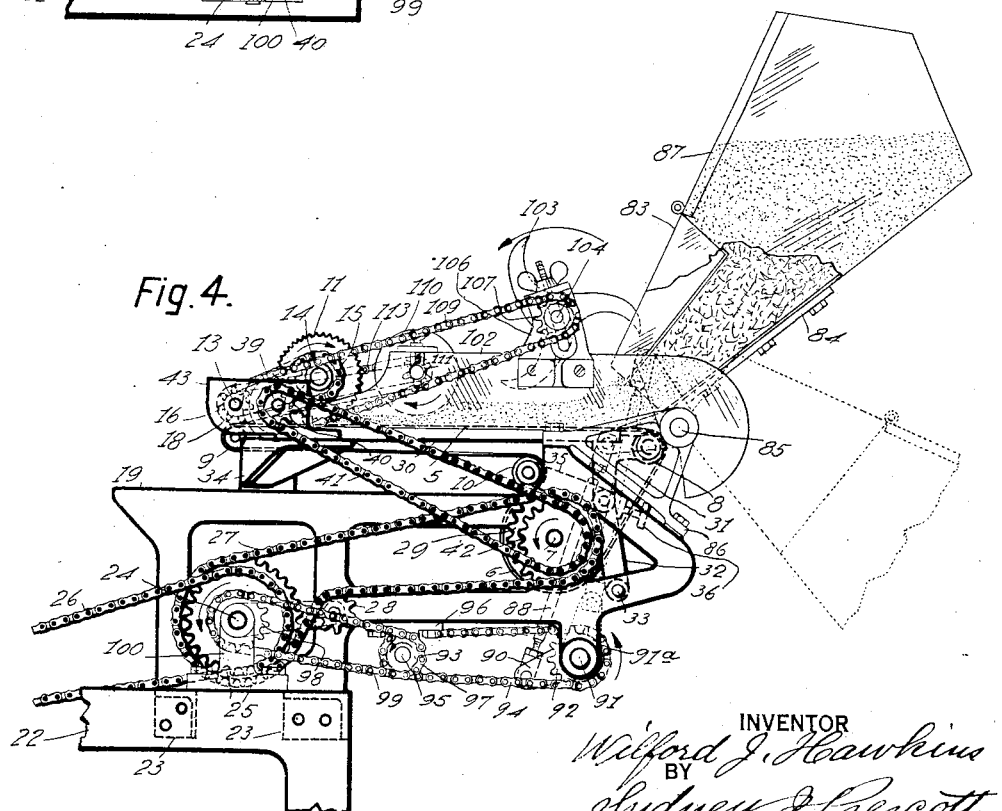
Fig. 4 is a side elevation of the assembly shown in Fig. 3.

In all figures, two different thicknesses of lines are used: heavy lines indicate the parts belonging to the standard cigar machine which are the same in all the four figures; light lines indicate the interchangeable parts, namely the long filler feed in Figs. 1 and 2, and the scrap feed in Figs. 3 and 4.

Referring to the heavy lines in Figs. 1 to 4, a tobacco feed belt 5 of the cigar machine is driven by a drum 6 on a shaft 7 and runs over pulleys 8, 9 and 10. The filler tobacco deposited on this belt, by either the long filler feed or the scrap feed, is carried to large starwheels 11 suspended from an adjustable bracket 12 pivoted on a shaft 13 and driven by a sprocket 14 and chain 15 from a sprocket 16 on this shaft, which is supported by brackets 17. After emerging from under the starwheels 11, which rest on the tobacco and by their weight level the layer, the filler tobacco passes under small starwheels 18 which drive it forward under a charge cutter 59 where it is cut into bunch charges, the individual charges then being transferred to the rolling table on which the binder is applied, and the charge is rolled into a cigar bunch which afterwards is pressed into the desired cigar shape and finally covered with the wrapper, re-rolled, and finished.

The cigar machine feed belt 5 is supported by the side frames 19 and 20 of the cigar machine mounted on the pedestals 21 and 22, forming part of the main frame of the cigar machine, by the cross beams 23. The drive shaft 24, which constitutes the main drive shaft for both long filler and short filler feeding mechanisms, has on it a double sprocket 25 which is driven by a chain 26 from the cigar machine main drive (not shown), and which, by means of a chain 27 running over an adjustable idler sprocket 28, drives a sprocket 29 on drum shaft 7 of the feed belt 5. The working portion of the latter is supported by the plate 30 extending between pulleys 8 and 9. The pulley 8 and one end of a plate 30 are supported by a bracket 31 held by two side brackets 32 mounted on a tie rod 33 between frames 19 and 20. Pulley 9 and the other end of the belt supporting plate 30 are carried by the cross beam 34 of the side frames 19 and 20. The adjustable pulley 10 is held by two belt tightener brackets 35, each of which has an adjusting screw 36.

The shaft 13 has secured to it a gear 37 in mesh with gear 38 on a shaft 39 which is driven by a sprocket 40 and a chain 41 from a sprocket 42 on the drum shaft 7. The gears 37 and 38 are enclosed in a gear box 43, which supports the shafts 13 and 39.

Referring now to the long filler feeding mechanism shown in light lines in Figs. 1 and 2, this mechanism is mounted on a main base or bed 44, which is detachably secured in any desired way, as by bolting to the upper surface of the side frame 19 which is provided with suitable surface and bolt holes (not shown) to receive and attach the bed. This bed is also detachably secured to the pedestal 22 of the cigar machine by means of the pedestal bracket 82 secured to the underside of bed 44 and detachably fastened at its lower end to said pedestal 22 which is also provided with a suitable bearing surface and screw holes to attach the same. Secured on the bed 44 are the pedestal brackets 57 and 65 and the lateral bracket 45, which serve to support the various parts of the filler feed to be hereinafter described. By disconnecting the bed 44 from the side frame 19 and the pedestal bracket 82 from the pedestal 22, it will be observed that the entire frame of the filler mechanism, together with the mechanism thereon, can be removed as a unit from the cigar machine.

The bracket 45 attached to the side of bed 44 supports the feed table 46 and the outer ends of the cross feed belts 47, 48 and 49, while the bed 44 supports the inner ends of the cross feed belts. The long filler tobacco is placed by hand into the channel formed by a horizontal feed belt 47 and the vertical feed belts 48 and 49. The horizontal belt 47 is supported by fixed pulley 50 mounted on the bed 44 and by adjustable pulley 51 near the outer end of bracket 52. The vertical belts 48 and 49 are held by the flanged pulleys 53 mounted respectively on bed 44 and at the end of bracket 45.

On its forward motion, the filler tobacco which is thus advanced in the form of a narrow strip in which the tobacco leaves lie lengthwise, enters a funnel 54 which guides it under the leveling roller 55 suspended by the pivot arm 56 from the pedestal bracket 57. After passing under a compressor 58, the filler strip is advanced to the corrugated cutter 59 which cuts it into bunch lengths which are fed side-ways onto the feed belt 5 of the cigar machine by a swinging arm 60 which has the counterweight 61 and sweeps over the pivoted platform 62 upon which rests the filler while being cut.

An adjustable weight 61 governs the density of the filler mass, each section pushed forward by the arm 60 advancing against the sections previously assembled on the lengthways cigar machine feed 5, until the density of the accumulated mass balances the weight. At the end of each stroke, the transfer arm releases the cross-ways feed, so that as soon as the density of the accumulated section mass balances the weight 61, and does therefore not permit the same to carry the next section to the end of the transfer stroke, the cross feed will not operate during the next cycle of the machine, and no new section will be transferred until the lengthwise feed of the machine has advanced a step during the cycle, thereby making room for a new section to be added without exceeding the required density.

For the purpose of accomplishing this feed control, the weight-holding arm 63 is mounted on a fulcrum shaft 64 supported by the pedestal brackets 57 and 65, this fulcrum shaft carrying an arm 66 which is connected by a rod 67 with control fingers 68, 69 and 70. The cross-ways feed is intermittently driven through suitable driving connections (not shown) by ratchet 71, mounted on a shaft 72 journalled in bracket 82, which ratchet is operated by means of the pawl 73 pivoted in one end of the lever 74. The latter is fulcrumed on the shaft 72 and is swung back and forth by the rod 75 connected to the crank 76 detachably secured on shaft 24. On the shaft 24 is demountably secured the driving sprocket 77 which, by chain 78 running over the adjustable idler sprocket 79, drives the sprocket 80 on a cam shaft 81. The feed drive shaft 24 is journalled between its ends in a projecting portion of the demountable pedestal bracket 82.

Referring to the light lines in Figs. 3 and 4, the scrap filler tobacco is placed in a swingable magazine or hopper 83, which periodically delivers a predetermined quantity of tobacco onto the feed belt 5 of the cigar machine. Brackets 84, which carry the hopper, are pivotally mounted on shaft 85 supported by brackets 86 detachably secured by screws to suitably prepared bearing surfaces having the necessary threaded holes on the side frames 19 and 20 of the cigar machine. The hopper 83 has the hinged cover 87 and is swung up and down by the adjustable rod 88 attached to the lever 89 on shaft 85. The rod 88 is operated by the crank 90 fastened on shaft 91 demountably journalled in bearings 91$^a$ provided for this purpose on frame members 19 and 20, which shaft is driven by the sprockets 92 and 93 and the chain 94 from shaft 95 supported by demountable brackets 96, secured by screws in threaded holes provided for this purpose on the frame members 19 and 20. Shaft 95 is driven by the sprockets 97 and 98 and the chain 99 from shaft 24 of the cigar machine, which in this case is supported by the pedestal bracket 100 attached to pedestal 22 in the place of bracket 82 of Figs. 1 and 2.

The tobacco charge left on the feed belt after the hopper 83 has been moved downward to the dotted position shown in Fig. 4, is leveled as the charge is carried by the belt between the adjustable wall 101 and the stationary wall 102 forming the feed channel by the adjustable rakers 103, which also regulate the quantity of tobacco delivered to the starwheels 11 of the cigar machine. The walls 101 and 102 are supported near one end on the bracket 35 and at the other end rest on the plate 30. The rakers 103 are mounted on shaft 104 journalled in blocks 105 adjustable in the slots of brackets 106 secured on adjustable side walls 101 and 102. Shaft 104 is driven in the direction of the arrow by the sprockets 107 and 108 and the chain 109 from shaft 39 of the cigar machine. The leveled scrap passes under the adjustable compacting roller 110, which is supported by the channel walls 101 and 102, and is driven in the direction of the arrow by sprockets 111 and 112 and chain 113 from the shaft 13 of the cigar machine. The width of the feed channel is so adjusted that charge cut from the scrap band and fed into the cigar machine will be of the desired length. It will be noted that the various parts of the short filler feed are all secured through walls 101 and 102 and shaft 85 to brackets 86 and can therefore be dismounted by detaching brackets 86.

From the above description of the long filler and short filler feeding mechanism and their attachment to the cigar machine, it will be seen that the cigar machine having the long filler feed attached may be changed to operate on short filler as follows:

The arm 76 and sprocket 77 are dismounted from the shaft 24 and the shaft slipped out of the bracket 82, the chain 78 is disconnected and the bolts and screws fastening the pedestal bracket 82 to the pedestal 22 and the bed 44 to the side frame 19 are unscrewed. Then the pedestal and bed are removed, thus removing the entire long filler feeding mechanism, as a unit, from the cigar machine. The short filler feeding mechanism is then substituted by mounting sprocket 98 on the shaft 24, mounting bracket 100 on said shaft to support the same and attaching said bracket 100 to pedestal 22. Brackets 96 supporting shaft 95 are then mounted on the side frames 19 and 20, shaft 91 is mounted in the bearings 91$^a$ provided for this purpose on frames 19 and 20, chains 99 and 94 are fitted over sprockets 98, 93, 97 and 92 on these shafts, connecting these shafts so as to be driven by shaft 24. Arm 90 to which connecting rod 88 is secured, is mounted on shaft 91. Brackets 86, supporting the hopper, are screwed to the prepared bearing surfaces on the frames 19 and 20, with the channel sides 101 and 102 resting on the plate 30. The shaft 13 and shaft 104 are connected by chain 109 on sprockets 110 and 111. The cigar machine is then ready for operation on short filler tobacco.

Since the two feeding mechanisms are permanently mounted as a unit on their respective supporting elements and the main frame of the cigar machine is already prepared to selectively support by means of these elements either feed in operative relation to the belt 5, the change from one feed to the other can be accomplished with a minimum labor, practically the only fitting required being that involved in connecting up the various drives for each feed.

What is claimed is:

1. In a cigar machine, the combination with a feed belt and associated operating mechanism, of a frame supporting said belt and mechanism and provided with means for selectively supporting and driving a long filler feeding mechanism and a short filler feeding mechanism delivering filler to said belt, in order that the major part of the cigar machine may selectively operate upon either long filler or short filler.

2. In a cigar machine, the combination with a feed belt and associated operating mechanism, of a frame supporting said belt and mechanism and provided with means for selectively supporting and driving a long filler feeding mechanism transversely arranged with respect to said belt and a short filler feeding mechanism longitudinally arranged with respect to said belt, in order that the major part of the cigar machine may selectively operate upon either long filler or short filler.

In testimony whereof, I have signed my name to this specification.

WILFORD J. HAWKINS.